(12) United States Patent
Arndt

(10) Patent No.: US 7,766,722 B2
(45) Date of Patent: Aug. 3, 2010

(54) APPARATUS FOR REMOVING PARASITES FROM BEES WITHIN A HIVE AND METHOD OF ACCOMPLISHING THE SAME

(76) Inventor: Maurice W. Arndt, 116 11th St. SE., Altoona, IA (US) 34082

(*) Notice: Subject to any disclaimer, the term of this patent is extended or adjusted under 35 U.S.C. 154(b) by 330 days.

(21) Appl. No.: 12/023,440

(22) Filed: Jan. 31, 2008

(65) Prior Publication Data
US 2009/0197507 A1 Aug. 6, 2009

(51) Int. Cl.
*A01K 51/00* (2006.01)
*A01K 55/00* (2006.01)
*A01M 1/20* (2006.01)

(52) U.S. Cl. .................... 449/2; 449/50; 43/130
(58) Field of Classification Search .............. 449/2, 449/50, 52, 61; 43/127, 128, 129, 130
See application file for complete search history.

(56) References Cited

U.S. PATENT DOCUMENTS

| | | | | |
|---|---|---|---|---|
| 192,905 A | * | 7/1877 | Dreyer | 43/127 |
| 652,379 A | * | 6/1900 | Truby et al. | 43/127 |
| 2,662,332 A | * | 12/1953 | McIntire | 43/129 |
| 3,161,985 A | * | 12/1964 | Fiske et al. | 43/129 |
| 3,392,479 A | * | 7/1968 | Simmons | 43/129 |
| 4,481,687 A | | 11/1984 | Arndt | |
| 5,069,651 A | | 12/1991 | Arndt | |
| 2005/0262756 A1 | | 12/2005 | Younger | |

OTHER PUBLICATIONS

American Bee Journal; Control Possibilities Against Wax Moths In Stored Combs; Aug. 1999; pp. 1, 628 & 630.
Paul P. Younger; Portable Vapor Bee Smoker, U.S. Appl. No. 10/358,825, filed Feb. 5, 2003; United States Patent and Trademark Office.
Younger; "Younger Smoker" and "Younger Bee Smoker"; advertisements dated 2005 and 2007.
Wikipedia, The Free Encyclopedia; "*Nosema ceranae*"; Jul. 30, 2007; http://en.wikipedia.org/wiki/Nosema_ceranae.

* cited by examiner

*Primary Examiner*—Rob Swiatek

(57) ABSTRACT

An apparatus and method for removing parasites from bees within a hive. The apparatus has a housing that extends from a first end to a second end and has a hollow interior. An air moving device is attached to the first end and a spout is connected to the second end. A container is located within the hollow interior of the housing and contains a parasite killing solution therein. The spout is then connected to a bee hive such that a heating system in communication with the housing can cause the parasite killing solution to boil allowing the air moving device to take the steam from the parasite killing solution to the interior of the hive to kill parasites.

16 Claims, 3 Drawing Sheets

APPARATUS FOR REMOVING PARASITES FROM BEES WITHIN A HIVE AND METHOD OF ACCOMPLISHING THE SAME

BACKGROUND OF THE INVENTION

This invention relates to a method and apparatus for removing parasites from bees. More specifically, this invention relates to a portable apparatus for applying a parasite killing steam solution within a bee hive.

The collection of honey within bee hives is usually accomplished by means of a plurality of rectangular frames having a flat sheet of wax or wax covered plastic therein. The bees build the honeycombs on the sheet, and after the honeycomb is complete the beekeeper removes the frames and removes the honey from the frames. As long as individuals have been collecting honey from the bees in this manner parasites such as mites, beetles, moths and the like have been known for populating such hives killing off entire colonies of bees.

As a result of colony collapse due to parasites infiltrating bee hives, known in the art are a plurality of different devices and systems that are used in order to attempt to eliminate these parasites. One example is seen in U.S. Pat. No. 5,069,651 to Arndt. In that disclosure a device is disclosed that provides a recirculation system and heater in order to raise the temperature within the bee hive in order to kill off parasitic mites.

While the device of the '651 patent is effective for killing off the mites, problems still remain. For example, the '651 device is bulky and must be placed on top of the bee hive. Thus, transporting the device to multiple bee hives is arduous and undesirable. Additionally, the recirculation of heat tends not to be dispersed evenly within the bee hive as the heat is drawn in a path and does not cover the entire bee hive. Another problem with the device is that 120-220 volts of electricity is needed to power the device such that an individual has to buy a 3-4 kilowatt generator to be able to power a single device.

Thus, a principle object of the present invention is to provide a portable apparatus that effectively kills parasites within a bee hive.

Yet another object of the present invention is to provide a method for killing and removing parasites from a bee hive that minimizes costs associated with the method.

These and other objects, features, or advantages of the present invention will become apparent from the specification and claims.

BRIEF SUMMARY OF THE INVENTION

An apparatus for removing parasites from bees within a hive. The hive specifically has a top, bottom and side walls and enclose a hive compartment wherein a bottom opening is provided adjacent said bottom wall for permitting bees to enter and exit the hive compartment. The apparatus includes a housing that extends from a first end to a second end and has a hollow interior therebetween. Additionally provided is an air moving device having an opening that fits in sealing mating relation with the first end of the housing. A spout is attached to the second end of the housing and has a spout opening wherein the spout is fit in sealing mating relation over the bottom opening of the hive. A container is disposed within the housing that holds a parasite killing solution therein such that a heating system in communication with the housing heats the parasite killing solution to a boil to produce steam. The air moving device then causes the steam from the parasite killing solution to be forced through the housing and the spout opening into the hive in order to kill all parasites therein.

DETAILED DESCRIPTION OF THE PREFERRED EMBODIMENT

Figure 1:
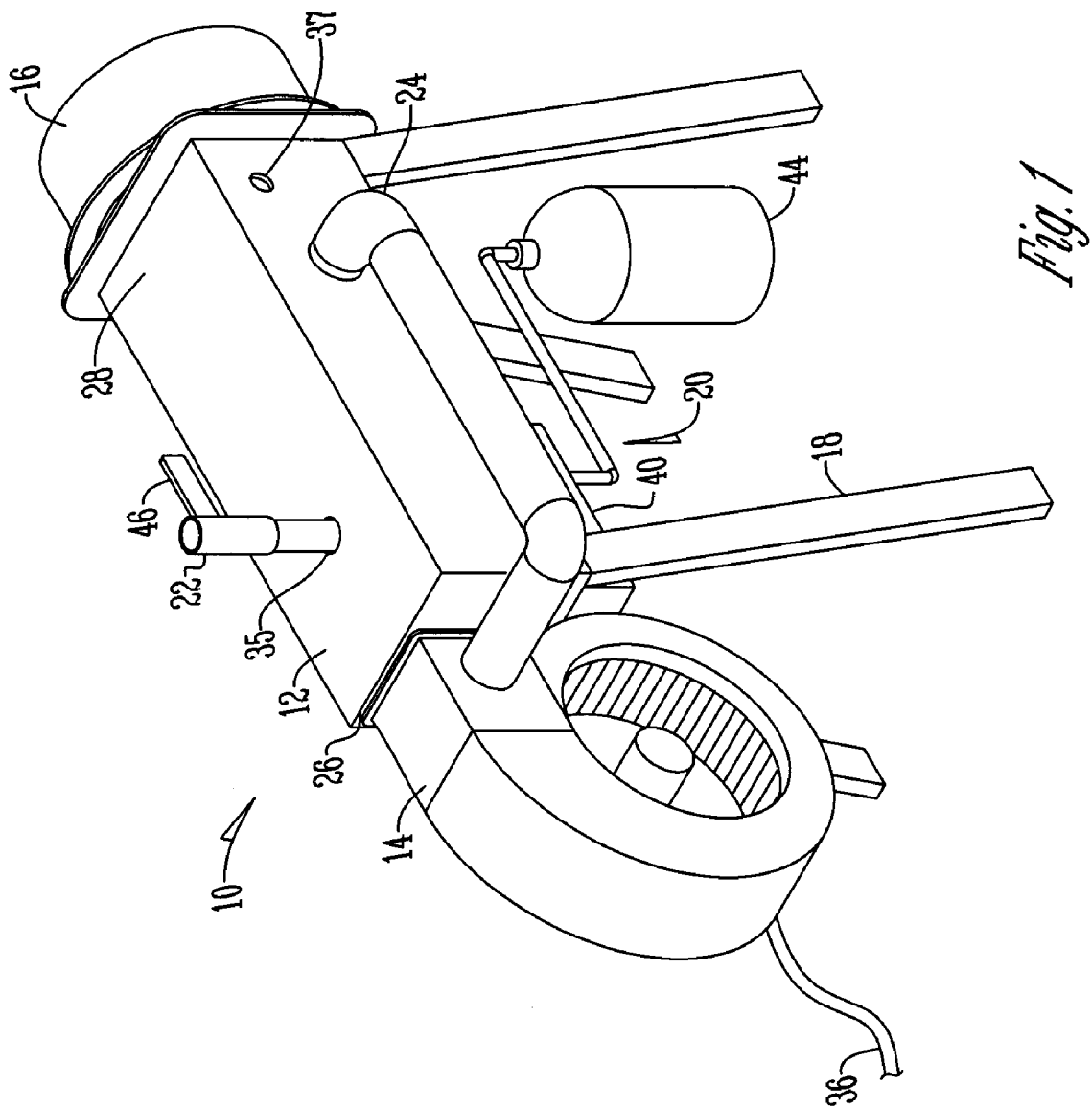
FIG. 1 is a side perspective view of a bee smoking apparatus.
Figure 2:
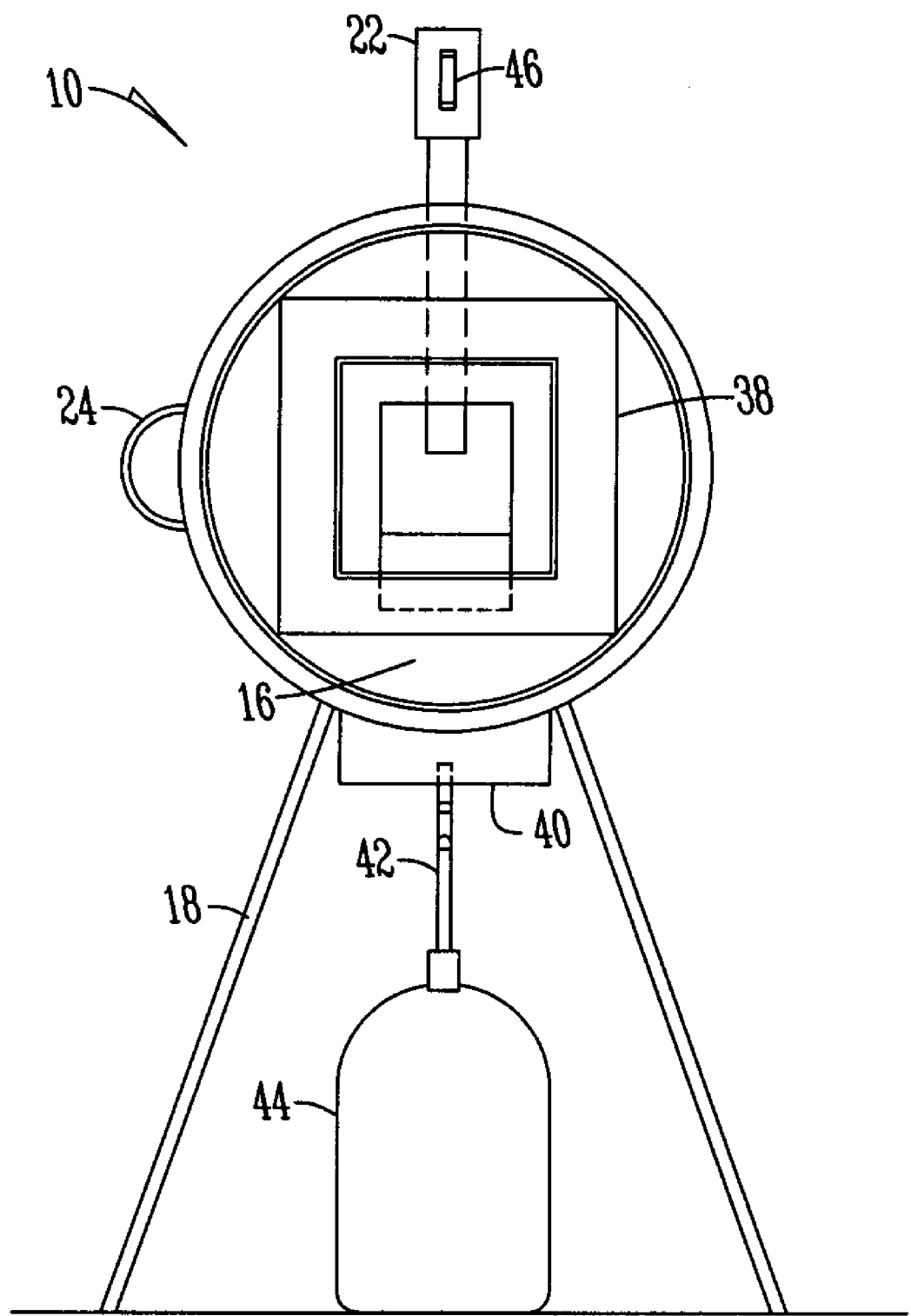
FIG. 2 is a end perspective view of a bee smoking apparatus.
Figure 3:
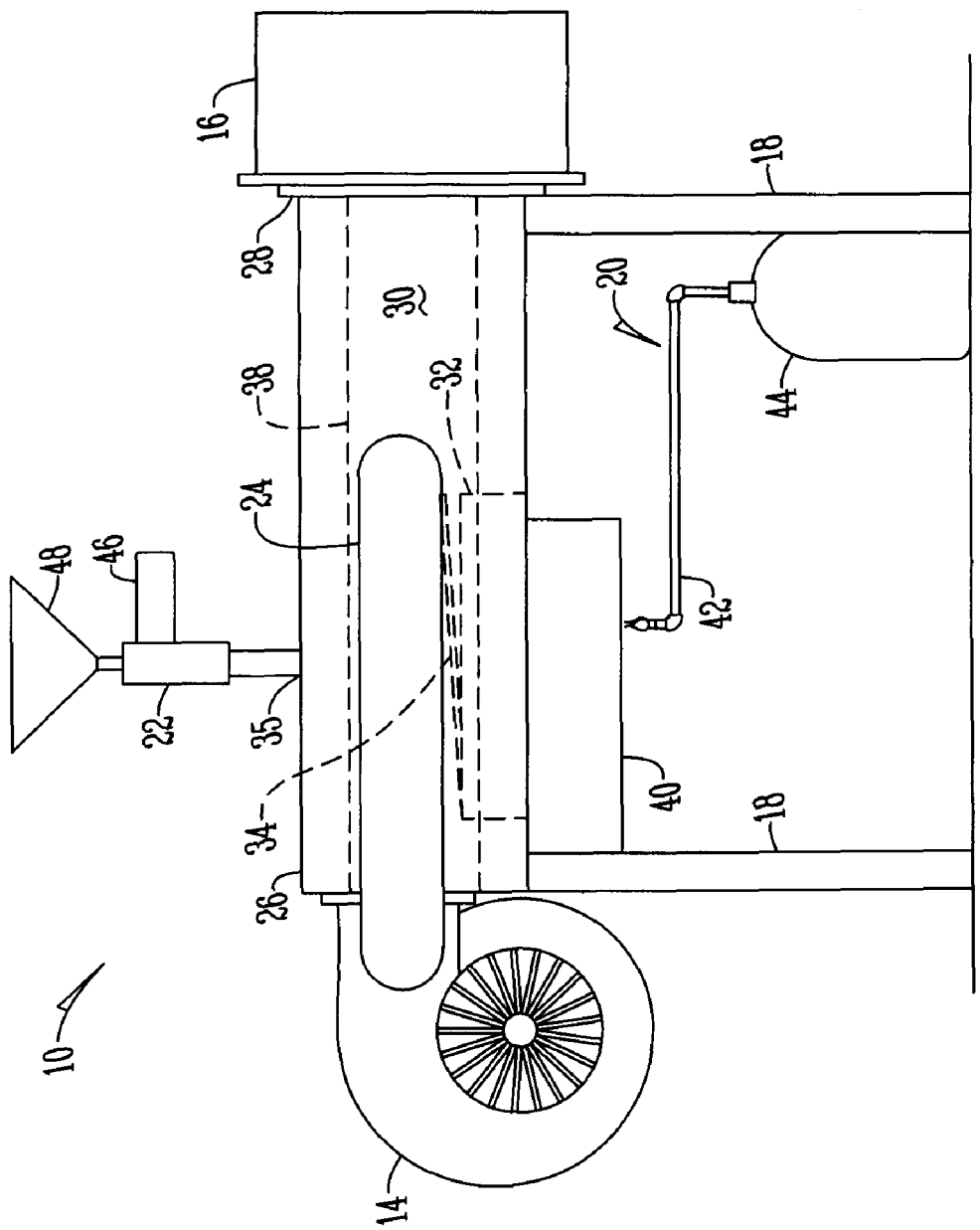
FIG. 3 is a sectional view of a bee smoking apparatus.

FIGS. 1-3 show a bee smoking apparatus 10 to be used in association with a bee hive (not shown). The bee hive can be any size or shape and in a preferred embodiment has top, bottom and side walls that enclose a hive compartment wherein a bottom opening is provided adjacent said bottom wall as taught in U.S. Pat. No. 5,069,651 to Arndt. The '651 patent is incorporated in full herein.

The bee smoking apparatus 10 has a housing 12 that is connected to and positioned between an air moving device 14, such as a blower, and a spout 16. A pair of legs 18 support the housing 12, as well as support a heating system 20 that is connected to the legs 18. Connected to the top of the housing 12, and in fluid communication with the housing 12, is an application tube 22. Also, attached to and extending along the housing 12 is recirculation conduit 24 that is attached to and provides air flow communication between the housing 12 and air moving device 14.

The housing 12 in a preferred embodiment is made of stainless steel and has a rectangular shape. Specifically, the housing 12 extends from a first end 26 to a second end 28 and has a hollow interior 30 (See FIG. 3) extending therebetween. Disposed within and extending through the housing 12 is an inner tube 38 that communicates with the air moving device 14. Underneath and extending into the inner tube 38 is a container 32 (See FIG. 3) such as a cup that has a guard member 34 attached thereto. The container 32 houses a parasite killing solution therein wherein the guard member 34 prevents the solution from splashing out of the container during the heating and boiling process. In a preferred embodiment the parasite killing solution is an acetic acid mix wherein the solution contains one part acetic acid for three parts of water. White vinegar may be used as the source for the acetic acid. Further, in a preferred embodiment the container 32 and guard member 34 are made of a stainless steel material as is the housing 12 to protect against corrosion as a result of contact with the acetic acid.

The housing 12 additionally contains an opening 35 disposed therein to receive application tube 22 that is located adjacent to the container 32 such that solution poured through the application tube 22 is directed toward and caught within the container 32. Optionally, side ports 37 may be disposed through the housing 12 adjacent the second end 28 to pull additional air through the housing 12.

The air moving device 14 has an air moving opening that is sealed fit to the first end 26 of the housing 12 and the intake conduit 24. Said connection provides an air flow communication path between the air moving member 14 and the housing 12. The air moving device 14 in a preferred embodiment is a 12 volt blower that takes only a minimum amount of electricity to operate. Attached to the air moving device is a power cord 36 that is used to extend to a power source (not shown) to provide electricity to the air moving member 14 for actuation. As an example, the power cord 36 may go to an outlet or alternatively may have a connection that allows the cord 36 to be placed in a cigarette lighter within a vehicle, or attached to the vehicle battery.

The spout 16 is attached to the second end 28 of housing 12. The spout 16 is preferably made of stainless steel material and is generally of a round configuration. Specifically, the spout opening is of size and shape to fit in the bottom opening (numeral 18 in the '651 application) of the bee hive.

The heating system 20 has a flame guard 40 that is attached to the housing 12. Specifically, the flame guard allows a flame to be disposed within the flame guard 40 and captures heat therein in order to transfer heat to within the housing 12. In a preferred embodiment the flame guard 40 is made of a heavy metal material that not only helps trap heat but additionally protects others from the flame disposed therein.

The heating system 20 also has a conduit system 42 disposed within the flame guard 40 to provide a fluid flow communication path between the flame guard 40 and a propane tank 44. The conduit 42 supplies propane from the propane tank 44 to the guard member 40 such that the end of the conduit 42 may be ignited to provide a constant flame. The conduit 42 may be comprised of a plurality of conduits joined by a plurality of elbow and connection pieces or alternatively has a one piece construction. Specifically, the heating system 20 communicates heat to the housing 12 in order to heat and boil the parasite killing solution within the container 32.

The application tube 22 is disposed through opening 35 within housing 12 to provide a fluid communication path therein. Specifically, the application tube 22 is secured to the housing 12 and contains a handle 46 extending therefrom. Handle 46 may be used to assist in pouring the parasite killing solution into the application tube 22 or in transporting the entire apparatus 10. Additionally, a funnel 48 can be disposed within the application tube 22 in order to pour the parasite killing solution therein. The application tube 22 is positioned within the inner tube 38 above and adjacent the container such that when the parasite killing solution is poured through the application tube 22 the solution falls within the container 32.

In operation, the bee smoking apparatus 10 is carried by an individual to a desired location to be connected to a bee hive. The spout 16 is matingly and sealing connected to the opening of the bee hive using any manner including but not limited to the use of hooks. As a result, a communication path between the inner tube 38 of the housing 12 and the bee hive is provided. Next, the parasite killing solution is poured into the application tube 22 and thus into the container 32. The heating system 20 is then ignited which boils the parasite killing solution within the container 32 to create steam. The steam is then conveyed from the inner tube 38 of the housing 12 through the spout opening and opening in the hive to the interior of the bee hive by the air moving device 14. The steam of the parasite killing solution is thus dispersed evenly throughout the bee hive as the bee hive is pressurized during the entire process. Additionally, the air recirculation conduit/duct 24 provides a recirculation flow path to the air moving device 14.

Thus, the resulting bee smoking apparatus 10 is a portable apparatus that may be easily transported to and from a plurality of bee hives. By using propane to heat the parasite killing solution the solution is heated quickly and the entire application process can occur within 30 seconds. Additionally, the entire system can be run on a mere 12 volt air moving system as a minimal amount of components are needed. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. An apparatus for removing parasites from bees within a hive, said hive having a top wall, a bottom wall and side walls enclosing a hive compartment, a bottom opening being provided in said hive adjacent said bottom wall for permitting said bees to enter and exit said hive compartment, said apparatus comprising:
   a housing extending from a first end to a second end and having a hollow interior therebetween;
   an air moving device having an opening sized and shaped to fit the first end of the housing;
   a spout attached to said second end of said housing and having a spout opening sized and shaped to fit said bottom opening of said hive;
   a container disposed within the housing to hold a parasite killing solution therein and an inner tube extending through the housing wherein the container extends into the inner tube;
   a heating system in communication with the housing to heat the parasite killing solution to a boil and create steam;
   a conduit attached to the housing to provide a communication path between the air moving device and the housing; and
   said air moving device causing steam from the parasite killing solution to be forced through the housing and spout opening into the hive.

2. The apparatus of claim 1 wherein the housing is made of stainless steel.

3. The apparatus of claim 1 wherein the container has a guard to prevent boiling parasite killing solution from contacting the hollow interior of the housing.

4. The apparatus of claim 1 wherein the heating system includes a propane tank wherein propane is supplied to a flame to heat the housing.

5. The apparatus of claim 1 further comprising an application tube disposed through the housing and positioned adjacent the container such that the parasite killing solution is conveyed through the application tube into the container.

6. The apparatus of claim 5 wherein a handle extends from the application tube to assist in pouring parasite killing solution into the application tube.

7. The apparatus of claim 1 further comprising an electric generator electrically connected to the air moving device to operate the air moving device.

8. The apparatus of claim 1 further comprising legs attached to the housing.

9. The apparatus of claim 1 wherein the heating system comprises a conduit partially disposed within a flame guard that is attached to the housing.

10. The apparatus of claim 1 further comprising a flame guard that is attached to the housing.

11. The apparatus of claim 10 wherein the flame guard is connected to the bottom of the housing.

12. The apparatus of claim 1 wherein the heating system heats the bottom of the housing.

13. A method for removing parasites from honey bees within a hive, said hive having a bottom opening for permitting said bees to enter and leave said hive, steps comprising:
    providing an apparatus having a housing that is attached to an air moving device at a first end and is attached to a spout at a second end and having a container disposed therein and an inner tube extending through the housing wherein the container extends into the inner tube;

sealing the spout to the bottom opening of the hive such that a spout opening provides communication between the housing and the hive;

pouring parasite killing solution into the container within the housing;

boiling the parasite killing solution with a heating system that is in communication with the housing;

conveying steam from the parasite killing solution through the housing into the hive with the air moving device to kill and remove parasites from the honey bees.

14. An apparatus for removing parasites from bees within a hive, said hive having a top wall, a bottom wall and side walls enclosing a hive compartment, a bottom opening being provided in said hive adjacent said bottom wall for permitting said bees to enter and exit said hive compartment, said apparatus comprising:

a housing extending from a first end to a second end and having a hollow interior therebetween;

an air moving device having an opening sized and shaped to fit the first end of the housing;

a spout attached to said second end of said housing and having a spout opening sized and shaped to fit said bottom opening of said hive;

a container disposed within the housing to hold a parasite killing solution therein;

an inner tube extending through the housing wherein the container extends into the inner tube;

a heating system in communication with the housing to heat the parasite killing solution to a boil and create steam; and said air moving device causing steam from the parasite killing solution to be forced through the housing and spout opening into the hive.

15. The apparatus of claim 14 wherein the container has a guard to prevent boiling parasite killing solution from contacting the hollow interior of the housing.

16. The apparatus of claim 14 wherein the container is positioned underneath the inner tube.

* * * * *